UNITED STATES PATENT OFFICE.

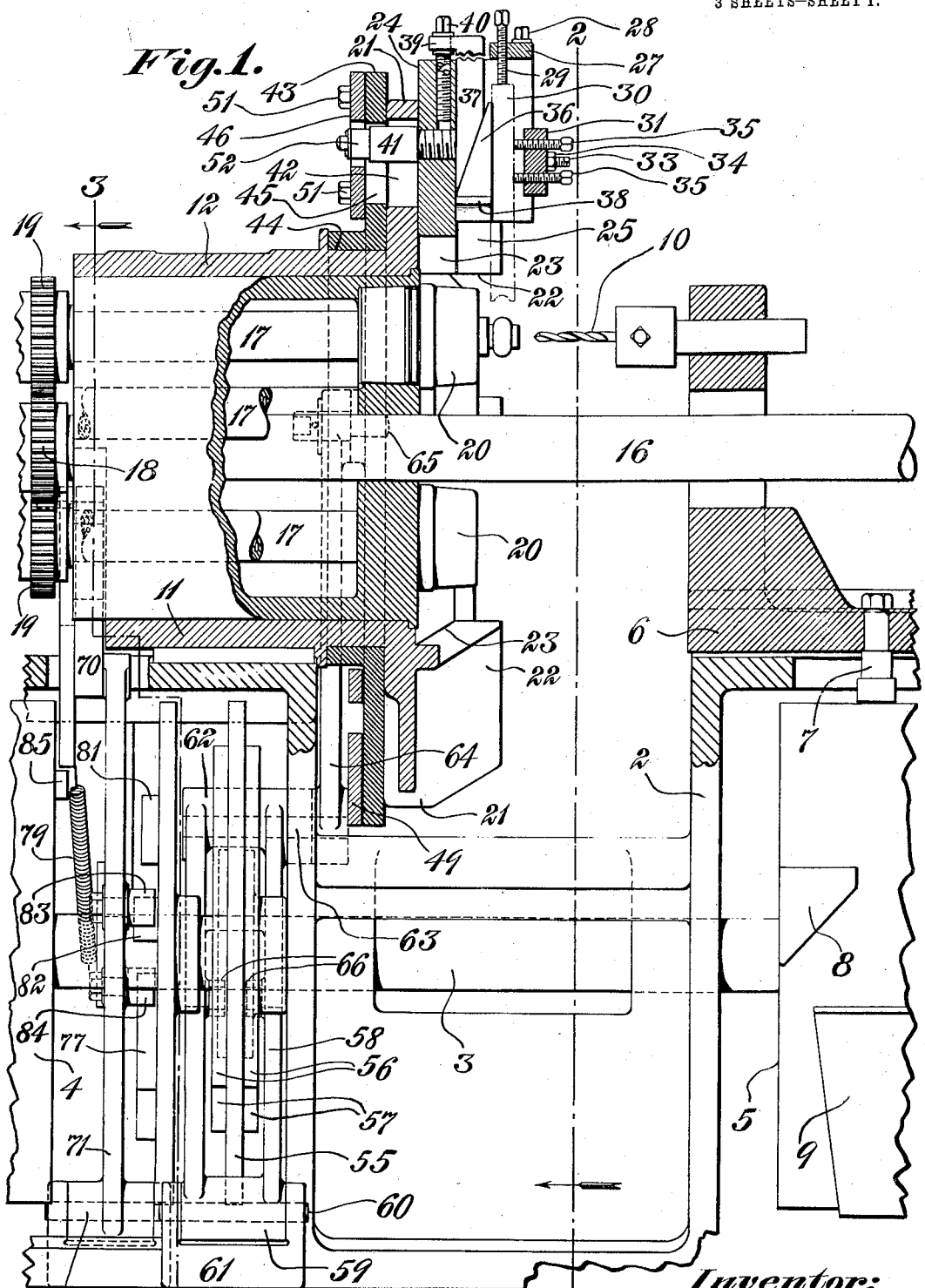

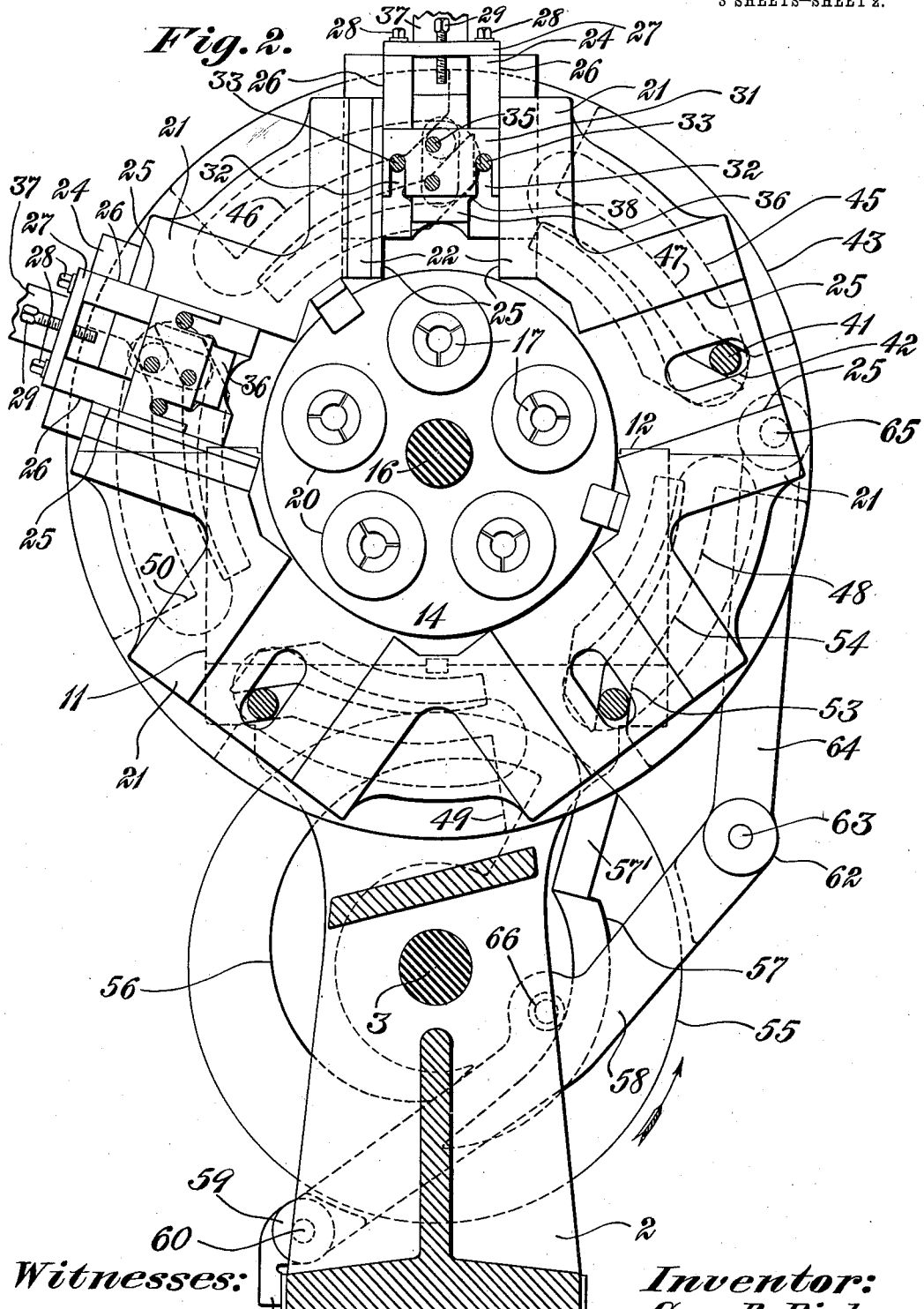

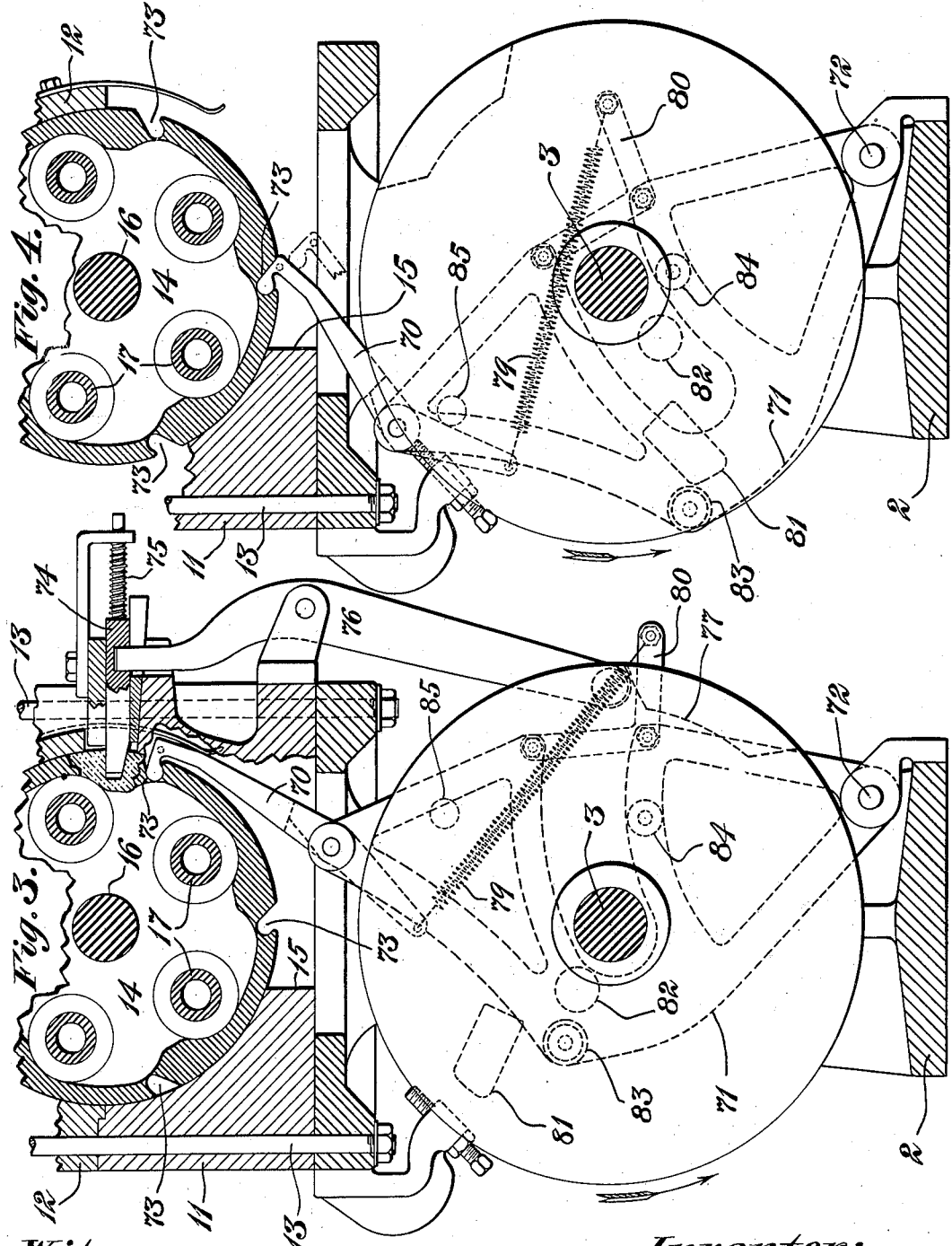

GEORGE B. PICKOP, OF HARTFORD, CONNECTICUT, ASSIGNOR TO THE NEW BRITAIN MACHINE COMPANY, OF NEW BRITAIN, CONNECTICUT, A CORPORATION OF CONNECTICUT.

SCREW-MACHINE.

1,110,570.  Specification of Letters Patent.  Patented Sept. 15, 1914.

Application filed November 24, 1913. Serial No. 802,591.

*To all whom it may concern:*

Be it known that I, GEORGE B. PICKOP, a citizen of the United States, residing at Hartford, in the county of Hartford and State of Connecticut, have invented certain new and useful Improvements in Screw-Machines, of which the following is a specification.

This invention relates to what I shall for convenience term a "screw-machine." As intimated this title has been selected for convenience, in view of the fact that one or more features of the invention can be incorporated in machines of other types.

Among the objects of the invention are the provision of means of a simple and effective character by which rigidity in construction and accuracy and preciseness in operation are assured.

In the drawings accompanying and forming part of the present specification, I have shown in detail one of the several convenient forms of embodiment of the invention, which to enable those skilled in the art to practice the same will be set forth fully in the following description. I do not restrict myself to this disclosure; I may depart therefrom in several respects within the scope of the invention defined by the claims following said description.

Referring to said drawings: Figure 1 is a side elevation partly in central vertical section, of the intermediate portion of a screw-machine involving my invention. Fig. 2 is a transverse section on the line 2—2 of Fig. 1, looking in the direction of the arrow. Figs. 3 and 4 are sections on the line 3—3 of Fig. 1, looking in the direction of the arrow, certain of the parts shown in Fig. 3 being omitted in Fig. 4.

Like characters refer to like parts throughout the several figures.

In a machine involving my invention there are several carriers, and although these carriers may be of any desirable form, I prefer for simplicity, that they consist of slides adapted to support suitable devices, for instance tools which may be of any convenient nature. In conjunction with these slides there is a main or master cam adapted through the intervention of suitable means, to transfer its effect to auxiliary cams. By virtue of this organization the main or master cam can be actuated at a constant or uniform speed, whereas the effects of the auxiliary cams can be totally different from each other. The foregoing is a brief description of one of the novel features of the invention. These carriers or slides are sustained in a novel manner, upon a stationary support and are arranged in approximately annular order about a series of rotary work spindles supported by a rotary head. The rotary spindle-supporting head is mounted in a novel manner.

With the foregoing general observations I will now describe the illustrations in detail.

The different parts of the machine can be sustained upon a suitable framework, that shown consisting of the bed or foundation member 2. The main or cam shaft is denoted by 3, and it is continuously rotated in any desirable manner, for instance by suitable gearing interposed between said shaft and one not shown, provided with a pulley to receive a belt or other driving means. At the right in Fig. 1 a cam-drum 5 is shown fastened to the shaft 3. On the upper side of the bed are slideways which receive the slide 6 provided with a pendent stud 7, adapted to be operated by cam members or strips 8 and 9 on the drum 5 to reciprocate the slide 6 which may be equipped with a series of tools, only one of which is shown, however, and that one being a drill as 10.

Mounted on the upper side of the bed 2 is the block 11 surmounted in turn by the block or cap-piece 12, the two parts being connected to each other and to said bed by bolts as 13, said parts 11 and 12 presenting a stationary head or bearing for the rotary spindle-carrying head 14, the stationary head having an approximately cylindrical or circular chamber to receive the spindle-carrying head 14 for rotation. The lower or base block 11 is slotted as at 15 for the passage of an indexing-pawl as will hereinafter appear. The stationary head, made up as shown of the superimposed parts 11 and 12, constitutes not only a bearing for the rotary spindle-carrying head 14 but also presents a convenient support for certain tool-carriers as will hereinafter appear.

The ends of the rotary head or barrel 14 have openings to receive the rotary shaft 16 which may be turned in any desirable manner. The work-spindles 17 in the organization shown are simultaneously rotated from said shaft which for such purpose has fastened to it a spur-gear 18 meshing with pinions 19 rigid with the respective work-spindles 17 furnished with chucks or equivalents 20.

The stationary head consisting as already described, of the superimposed blocks 11 and 12, is provided at its forward side with several integral radial projections 21, furnished with parallel forwardly-extending walls 22, the inner faces of which are undercut as at 23 to provide ways for the slides 24, the rear faces of which latter engage against the bodies of the said projections 21. The inner faces of the respective walls 22 forward of the undercut portions 23 are straight and in parallelism with each other as at 25 to provide guideways for certain devices hereinafter described. Each slide 24 is equipped with forwardly-extending, parallel walls 26 which slide in contact with and between the parallel faces 25 to which I have just alluded. Bridging the outer sides of the walls 26 are the cross bars 27, held in place by screws 28 tapped into the respective walls 26. Through each cross piece in turn is tapped a screw 29 adapted to engage against the outer end of a tool 30. Crossing the side walls 26 at the front are the bridge members 31, which have open ended slots 32 to fit over threaded studs 33 extending outwardly from the respective side walls 26, the threaded studs or screws 33 receiving the holding-nuts 34 which engage against the outer faces of the bridge members 31 to clamp the same in place. Through the bridge-pieces are tapped binding-screws 35 which engage the forward sides of the respective tools to hold the same firmly against the wedge members 36 coöperative with the wedge members 37, the inner wedge members 36 being relatively or normally stationary and having on their sides fins or ribs 38 to engage grooves or channels in the flat faces 25. The upper wedge members 37 are provided with lugs 39 to receive screws 40 tapped into the respective slides 24. It will be clear that the beveled surfaces of the respective wedge members 36 and 37 engage each other and that through the adjustment of the several screws 40 the wedge members 37 can be adjusted with respect to the wedge members 36 to laterally position as required, the several tools 30.

Tapped into the respective tool slides 24 are screws 41 constituting suitable studs or projections, which extend rearwardly from the respective slides and through radially elongated slots 42 in the bearings or projections 21, so that they can be operated by suitable means as will hereinafter appear. It will be remembered that I have mentioned the fact that there are auxiliary cams for operating the several tool carriers or slides 24. The ring 43 answers satisfactorily as a support for these auxiliary cams, being shown as supported for rocking motion in an annular channel 44 extending circumferentially of the blocks 11 and 12, the body of the ring 43 being slotted as at 45 for the passage of the several studs 41. As will be understood there are five of said cams denoted by 46, 47, 48, 49 and 50, and as illustrated they are arranged in annular order on the back or rear side of the oscillatory support or ring 43, by reason of which they are readily accessible. They may be of like or different construction. When they are of different construction which is the usual case, one may impart to its coöperating slide a certain throw, while the two adjacent auxiliary cams may transfer different throws to their slides. By reason of this condition I can produce entirely different movements of the respective tool carriers, notwithstanding the fact that the main or master cam is driven at a constant or uniform velocity or speed. The several relatively fixed cams 46 to 50 inclusive are preferably removably mounted, and for this purpose can be held in place by screws 51 tapped into the ring 43, and as shown each consists of two independent segments spaced or separated to present a slot to receive between it the outer end of a coöperating stud 41 which is preferably equipped at such end with an anti-friction roller 52. Each cam slot has a tool advancing portion 53 and a tool feeding portion 54, the tool advancing portion being sufficiently eccentric to the axis of rotation of the cam ring 43 to effect a quick positioning of the tool up to a point where it is about to engage the work, and the tool feeding portion being of less eccentricity or such as will effect proper cutting feed for the particular tool employed. When the ring 43 is in its primary position (Fig. 2) the respective studs 41 or anti-friction rollers 52 thereon, will be in the tool advancing parts 53 of the cam slots, by virtue of which on the first part of the forward movement of the ring 43 the respective slides 24 will be moved inward to carry their tools substantially into contact with the work, the tools then being given the proper feeding speed by the comparatively slightly eccentric portions 54 of said cam slots, the slides being moved outward upon the backward movement of the oscillating cam ring 43.

To oscillate the ring 43 any desirable means may be provided, although that now to be described has been found satisfactory. Fastened to the main shaft 3 is the cam disk 55 constituting a suitable main or master cam. Upon opposite sides of this disk are fastened the duplicate cam members 56, 57 and 57'. The cam disk 55 is straddled by the mating levers 58 connected as shown at their lower ends by the integral hub 59 which receives the pivot pin 60 supported by the bracket 61 fastened to the base portion of the bed 2. The levers 58 are connected at their upper end by an integral hub 62 which receives the pivot 63 by which the link 64 is connected to the two levers 58, the upper end of the link being pivoted as at 65 to the ring 43 near the periphery thereof. The levers 58 are equipped on their inner sides with studs 66 which preferably consist of anti-friction rollers, one stud or anti-friction roller being coöperative with the cam members 56, 57 and 57' on one side of the disk 55, while the other stud or anti-friction roller coöperates with the like cam members 56, 57 and 57' on the opposite side of said disk. The respective cam members 57 and 57' abut so as to produce practically the effect of a single cam member.

In Fig. 2 the parts are shown as occupying their normal or primary positions, the anti-friction rollers 66 being against the inner sides of the cam-members 57. As the cam disk rotates in the direction of the arrow thereon and when the cam members 56 come in contact with the anti-friction rollers 66, the two levers 58 are drawn downward, this motion continuing until the rollers 66 leave the cam members 56, the downward movement of the levers being a comparatively slow one. When the cam members 56 pass off the two anti-friction rollers 66, said anti-friction rollers are met by the companion cam members 57' which with the cam members 57 are adapted to impart a quick return movement to the two levers 58. When the rollers reach the position they are shown as occupying in Fig. 2 and until they are engaged by the cam members 56, the levers 58 will not be operated, remaining idle or at rest, and in this particular period the rotary head 14 is indexed. As the levers 58 are oscillated in the manner described, they through the link 64, impart a corresponding movement to the ring 43 whereby said ring is initially slowly advanced and then rapidly retracted. As the ring 43 is thus operated the several cams 46 to 50 inclusive, first move the slides 24 inward, so that the tools thereon will be in position to engage the work, and when the studs 41 are in the tool-feeding portions 54 of the cam slots, the slides will be slowly fed inward the slides being moved outward upon the backward travel of the cam ring 43.

It will be understood that after each tool has performed its office and that when the two levers 58 are in a state of rest as already described, the head is indexed, by reason of which each piece of work can be brought under the action of each of the tools. Any desirable means may be provided for indexing said head, although that now to be described answers satisfactorily in this respect. An indexing pawl is shown at 70 being pivoted between its ends to the upper end of the lever 71 pivotally supported at its lower end as at 72 to the framework of the machine. The head 14 has peripheral notches 73 to receive the tooth of the indexing pawl 70, said head being locked against accidental movement by the bolt 74 pressed inwardly by the spring 75 and retracted by the lever 76 supported on the framing of the machine, and the free end of which is operable by the camming member 77 on the rotary disk 78 to effect the withdrawal of the bolt 74, the instant before indexing should take place. The indexing pawl 70 is held in its advanced position by the spring 79 connected with the lower arm thereof and with the projection 80 on the lever 71. The lever 71 is oscillated by the cam projections 81 and 82 which for such purpose engage studs 83 and 84 on the adjacent side of the lever 71, the said lever on each advance thereof being carried a distance agreeing to that between two of the notches 73. To disengage the tooth of the indexing pawl 70 from a notch which it may occupy after indexing has been completed, the stud 85 may for such purpose engage the lower arm of said pawl, said stud 85 in the present case being carried on the cam drum 4.

What I claim is:

1. In a machine of the class described, the combination of a plurality of carriers, a main cam, individually adjustable auxiliary cams for imparting to said carriers varying movements, and means for transferring the effect of the main cam to the auxiliary cams.

2. In a machine of the class described, the combination of a plurality of carriers, individually adjustable cams for imparting to said carriers varying movements, an oscillatory member on which the cams are mounted, and means for operating said oscillatory member at an approximately uniform speed.

3. In a machine of the class described, the combination of a plurality of slides, individually adjustable cams for imparting to said slides varying movements, a ring on which said cams are mounted, and means for oscillating said ring.

4. In a machine of the class described, the combination of a plurality of slides, a main cam, a ring, individually adjustable auxiliary cams supported by said ring, for imparting to said slides varying movements, and means operative by said main cam for operating said ring.

5. In a machine of the class described, the combination of a plurality of slides arranged in annular order, a main cam, a support, individually adjustable cams on said support, for imparting to said slides varying movements, and means for transferring the effect of the main cam to the auxiliary cams.

6. In a machine of the class described, the combination of a plurality of slides arranged in annular order, a main cam, individually adjustable auxiliary cams for imparting to said slides varying movements, a ring on which the auxiliary cams are mounted, and means for transferring the effect of the main cam to said ring to operate the latter at an approximately uniform speed.

7. In a machine of the class described, the combination of a plurality of slides, a main cam, auxiliary cams for simultaneously imparting varying movements to the slides, a device on which the auxiliary cams are movably mounted, and means operative by said main cam for operating said device.

8. In a machine of the class described, the combination of a support provided with projections, slides supported by said projections, a ring, the projections being located between the ring and the slides, the ring being carried on said support, the projections and ring having slots, and the slides having studs extending through the slots, cams on the outside of the ring, engaging said studs for independently operating the slides, and means for operating the ring.

In testimony whereof I affix my signature in presence of two witnesses.

GEORGE B. PICKOP.

Witnesses:
HEATH SUTHERLAND,
L. L. MARKEL.